United States Patent Office 2,951,837

Patented Sept. 6, 1960

2,951,837

NEW MONOAZO DYESTUFFS

Herbert Francis Andrew and William Elliot Stephen, Manchester, England, assignors to Imperial Chemical Industries Limited, London, England, a corporation of Great Britain No Drawing. Filed Aug. 18, 1958, Ser. No. 755,443

Claims priority, application Great Britain Aug. 23, 1957

7 Claims. (Cl. 260—153)

This invention relates to new monoazo dyestuffs, and more particularly it relates to new monoazo dyestuffs containing a s-triazine ring, valuable for the production of fast yellow to orange colourations on cellulose textile materials.

We have observed that valuable dyestuffs may be obtained by causing to react together equimolecular proportions of certain dihalogenotriazines and certain compounds of the azonaphthalene or benzene-azo naphthalene series which contain an amino or alkylamino group in para position to the azo group. In order to readily obtain the new dyestuffs in a pure form it is essential that the starting materials contain only the one grouping capable of reacting with the halogen attached to the triazine nucleus, and accordingly the starting materials should be free from other amino and alkylamino groups.

According to the present invention there are provided new monoazo dyestuffs which contain at least two ionic solubilising groups and are represented by the formula:

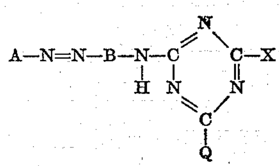

wherein A represents an aryl radical free from amino and alkylamino groups, B represents a 1:4-naphthylene radical, X represents a chlorine atom or a bromine atom, and Q represents a substituent bound to the triazine nucleus through a nitrogen atom, Q being further characterized in that it is free from groups making the dyestuff capable of undergoing a coupling reaction with a diazo component.

The ionic solubilising groups present in the new monoazo dyestuffs may be, for example, sulphonic acid or carboxylic acid groups.

In the above formula A may represent a radical of, for example, the benzene, naphthalene, benzthiazole or stilbene series, and it may be substituted except as aforesaid, for example it may be substituted by halogen atoms such as chlorine or bromine, nitro groups, acylamino groups such as acetylamino and benzoylamino, alkyl groups such as methyl and t-butyl, alkoxy groups such as methoxy and ethoxy, aryloxy groups such as phenoxy, sulphonic acid and carboxylic acid groups.

The symbol Q in the above formula may represent an amino or a mono- or di-substituted amino group wherein the substituents on the nitrogen atom are themselves free from groups known from the literature or from use in practice as rendering organic compounds capable of coupling with diazotised arylamines, for example, hydroxyl and amino or substituted amino groups and enolisable methylene groups.

A preferred class of dyestuffs are those corresponding to the above formula wherein A represents an amino-nitrogen-free radical selected from the group consisting of phenyl, naphthyl, benzthiazolyl and stilbenyl radicals carrying substituents selected from the class consisting of hydrogen, halogen, nitro, acylamino, lower alkyl, lower alkoxy, aryloxy, sulfo, and carboxy; B represents a 1:4-naphthylene radical of a para-coupled-1-amino napththalene compound; and carrying as substituents a member selected from the class consisting of hydrogen, sulfo, methoxy, and ethoxy; X represents a chlorine atom and Q represents a substituent bound to the triazine nucleus through a nitrogen atom and having the formula:

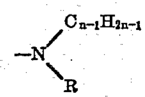

wherein n is an integer having a value from 1 to 3 and R is a substituent selected from the group consisting of hydrogen, phenyl, sulphophenyl, 4′-nitrostilbenyl-2,2′-disulfonic acid, sulpho-naphthyl and tosyloxy-sulphonaphthyl.

The new monoazo dyestuffs may be obtained by a process which comprises reacting together substantially equimolecular proportions of a 2:4-dihalogeno-6-amino-s-triazine which is incapable of coupling with a diazotised arylamine and an amino-azo compound of the formula:

$$A—N=N—B—NH_2$$

wherein A and B have the meanings given above so choosing the starting materials and the conditions of reaction that the product obtained contains at least 2 ionic solubilising groups and retains one chlorine or bromine atom attached to the triazine ring. This process forms a further feature of the invention.

The aminoazo compounds used in the above process may be readily obtained by coupling a diazotised arylamine with a para-coupling amine of the naphthalene series.

Suitable arylamines include, for example, orthanilic acid, metanilic acid, sulphanilic acid, aniline-2:5-disulphonic acid, 4-nitroaniline-2-sulphonic acid, 2-methoxy-aniline-5-sulphonic acid, 4-methoxy-aniline-2-sulphonic acid, 5-chloro-4-methyl-aniline-2-sulphonic acid, 2-naphthylamine-1:5-, 4:8- and 6:8-disulphonic acids, 2-naphthylamine-3:6:8-trisulphonic acid, 2-(4′-aminophenyl)-6-methyl-benzthiazole-mono- and di-sulphonic acids and 4-amino-4′-nitrostilbene-2:2′-disulphonic acid.

Suitable para-coupling amines of the naphthalene series include, for example, 1-naphthylamine-6-sulphonic acid, alpha-naphthylamine, 1-naphthylamine-7-sulphonic acid and 2-methoxy-1-naphthylamine-6-sulphonic acid.

The 2:4-dihalogeno-6-amino-s-triazine used in the above process may be obtained by interacting equimolecular proportions of a cyanuric halide and ammonia or a suitable primary or secondary amine which is so chosen that the product obtained is incapable of coupling with a diazotised arylamine.

Suitable amines include for example, aniline, N-methylaniline, N-ethylaniline, methylamine, ethylamine, p-amino-acetanilide, metanilic acid, sulphanilic acid, 1-naphthylamine - 6 - sulphonic acid, 2-(4′-aminophenyl)-6-methyl-benzthiazole, the p-toluene sulphonyl esters of 1:8-aminonaphthol-3:6-disulphonic acid and 2:5-aminonaphthol-1-sulphonic acid, and 2-naphthylamine-4:8-disulphonic acid.

The process of the invention is advantageously carried out in the presence of an acid-binding agent, preferably a carbonate or bicarbonate. It is carried out under such conditions that the final product still contains a single atom of chlorine attached to the triazine nucleus, that is, for example, in an organic solvent or preferably at a relatively low temperature in an aqueous medium. In general, the process is preferably carried out at a temperature between 30 and 40° C. and at a pH of from 6.5 to 8 in aqueous medium.

Occasionally it is advantageous to use a slight excess of one of the starting materials over the amount theoretically necessary.

The new monoazo dyestuffs may readily be isolated in the form of their sodium salts by adding common salt to the neutral aqueous medium, filtering off the precipitated dyestuff and drying.

The new monoazo dyestuffs may also be obtained by a modified process. In this modified process, the aminoazo compound is first reacted with one molecular proportion of a cyanuric halide, and the product so obtained is then reacted with one molecular proportion of ammonia or a primary or secondary amine which is chosen as indicated above.

Suitable amines are those mentioned above. The conditions of preparation and isolation of the new monoazo dyestuffs by this modified process are substantially those set out for the process of the invention. It is frequently convenient to add 2 molecular proportions of the amine, one half for reaction with the triazine and one half to act as acid-binding agent.

The new monoazo dyestuffs are valuable dyestuffs for cellulosic textile materials when applied in conjunction with an acid-binding agent, for example by the process described in Belgian specification No. 543,218, wherein the coloured textile material is aftertreated with an acid-binding agent, or by related processes wherein an acid-binding agent is applied to the textile material before or during the treatment with the dyestuff.

When so applied, the new monoazo dyestuffs give yellow to orange colourations very fast to washing and to light. They have an advantage over the dyestuffs of similar shade described in Belgian specification No. 543,218 in that they are more stable in aqueous solutions containing acid-binding agents; thus thickened printing pastes containing the new monoazo dyestuffs and an acid-binding agent are especially valuable for use in the printing process of Belgian specification No. 543,218.

The invention is illustrated but not limited by the following examples in which parts are by weight:

*Example 1*

Diazotised aniline-2:4-disulphonic acid is coupled with 4-naphthylamine-6-sulphonic acid and 11.06 parts of the trisodium salt of the 4-aminonaphthalene-1:1'-azobenzene-2':4':6-trisulphonic acid so obtained are dissolved in 100 parts of water and added during 30 minutes to a stirred suspension of 3.7 parts of cyanuric chloride in 100 parts of ice and water, the temperature being maintained at 3° C. by the addition of ice as required. The mixture is stirred until no diazotisable amine can be detected, 10% aqueous sodium carbonate solution being added as required to maintain the pH at 6.4. 9.28 parts of the disodium salt of 4-nitro-4'-aminostilbene-2:2'-disulphonic acid are then added and the mixture is stirred for 1 hour at 5° C., then heated to 50° C. and stirred for 2 hours, adding 10% aqueous sodium carbonate solution as required to keep the mixture at pH 7. Salt is then added and the precipitated dyestuff is filtered off. The filtrate is washed with 200 parts of acetone and the product is dried at 40° C.

The dyestuff so obtained is the pentasodium salt of the monoazo dyestuff of the formula:

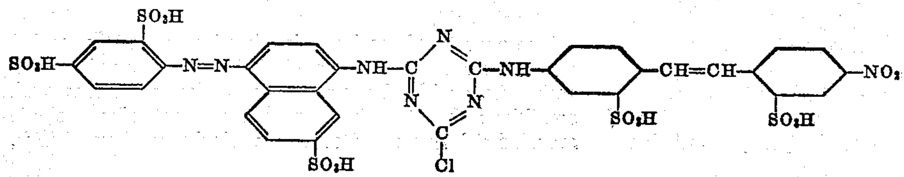

It dyes cellulose fibres from a hot alkaline dyebath in bright yellow shades of good fastness to light and washing.

Two other suitable colouring recipes which may be used are as follows:

(1) 100 parts of cotton fabric are padded in a 2% aqueous solution of the dyestuff and squeezed until the weight of the fabric is 200 parts. The fabric is dried, padded in an aqueous solution containing 1% of caustic soda and 30% of sodium chloride, and again squeezed until its weight is 200 parts.

The fabric is then steamed for 1 minute at 100° C. then rinsed in water, boiled in a dilute soap solution for five minutes, rinsed again in water and dried. It is dyed a level yellow shade having very good fastness to washing and to light.

(2) A printing paste is made by mixing together 2 parts of the dyestuff, 5 parts of urea, 40 parts of a 5% aqueous solution of sodium alginate, 52 parts of water and 1 part of sodium bicarbonate.

The printing paste is applied to cotton fabric by roller and the treated fabric is dried and then steamed for 5 minutes. The fabric is then rinsed in water, boiled in a dilute soap solution for five minutes, rinsed again in water and dried. The fabric is locally coloured a yellow shade where the printing paste was applied. The shade is very fast to light and to washing, there being very little staining of the adjacent white portions of the fabric when the printed fabric is subjected to severe washing tests.

By replacing the aminoazo compound used in the above example by an equimolecular proportion of the aminoazo compound named in the first column of the following table, and replacing the 4-nitro-4'-aminostilbene-2:2'-disulphonic acid by the amine named in the second column further valuable monoazo dyestuffs are obtained giving the shade named in the third column.

| Aminoazo compound | Amine | Shade |
|---|---|---|
| (As in Example 1) | aniline-3-sulphonic acid | Yellow. |
| 4-amino-1:2'-azonaphthalene-5':7:7'-trisulphonic acid. | aniline | Yellowish orange. |
| Do | ethylamine | Orange. |
| 4-amino-1:2'-azonaphthalene-3':6':8'-trisulphonic acid. | N-ethyl-aniline | Do. |
| 4-amino-3-ethoxy-1:2'-azonaphthalene-6':7:8'-trisulphonic acid. | Ammonia | Do. |

The formulae for the dyestuffs shown in this table are, respectively:

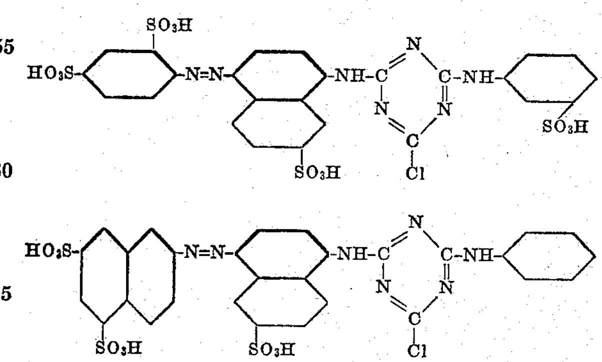

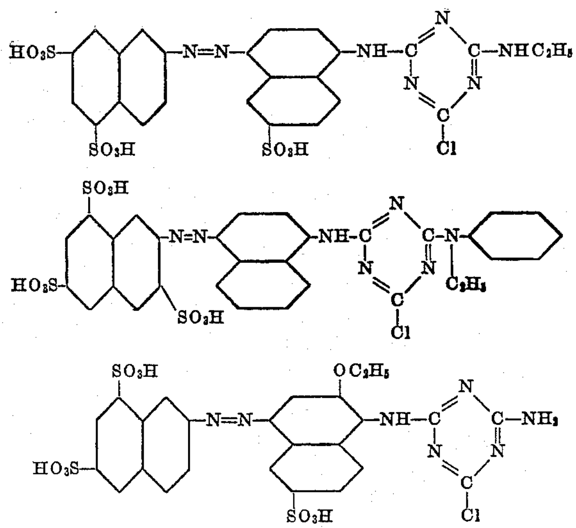

The respective dyestuffs shown in Example 1 and in the above table thus may be also identified by the chemical names: 2-chloro-4-[4″-nitro-2′:2″-disulphostilbenyl-4′-amino]-6-[naphthalene-1‴:1$^{iv}$-azobenzene-2$^{iv}$:4$^{iv}$:6‴-trisulpho-4‴-amino]-s-triazine; 2-chloro-4-[3′-sulphophenylamino]-6-[naphthalene-1″:1‴-azobenzene-2‴:4‴:6″-trisulpho-4″-amino]-s-triazine; 2-chloro-4-[5″:7′:7″-trisulpho-1′:2″-azo-naphthalene-4′-amino]-6-phenylamino-s-triazine; 2-chloro-[5″:7′:7″-trisulpho-1′:2″-azo-naphthalene-4′-amino]-6-ethylamino-s-triazine; 2-chloro-4-[3″:6″:8″-trisulpho-1′:2″-azo-naphthalene-4′-amino]-6-(N-ethyl)phenylamino-s-triazine; 2-chloro-4-[3′-ethoxy-6″:7′:8″-trisulpho-1′:2″-azo-naphthalene-4′-amino]-6-amino-s-triazine.

What we claim is:

1. Monoazo dyestuffs which contain at least two ionic solubilizing groups and are represented by the formula:

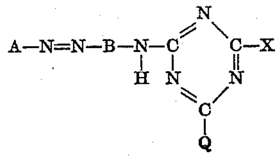

wherein

A represents an amino-nitrogen-free radical, selected from the group consisting of phenyl, naphthyl, benzthiazolyl and stilbenyl radicals carrying substituents selected from the class consisting of hydrogen, chlorine, bromine, nitro, acetylamino, benzoylamino, lower alkyl, lower alkoxy, phenoxy, sulfo, and carboxy;

B represents a 1:4-naphthylene radical of a para-coupled-1-amino naphthalene compound; and carrying as substituents a member selected from the class consisting of hydrogen, sulfo, methoxy, and ethoxy;

X represents a chlorine atom and Q represents a substituent bound to the triazine nucleus through a nitrogen atom and having the formula:

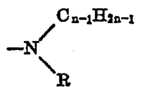

wherein $n$ is an integer having a value from 1 to 3 and R is substituent selected from the group consisting of hydrogen, phenyl, sulfophenyl, 4′-nitrostilbenyl-2,2′-disulfonic acid, sulfo-naphthyl and tosyloxy-sulfo-naphthyl.

2. The dyestuff which in its free acid form has the formula, 2-chloro-4-[4″-nitro-2′:2″-disulphostibenyl-4′-amino]-6-[naphthalene-1‴:1$^{iv}$-azobenzene-2$^{iv}$:4$^{iv}$:6‴-trisulpho-4‴-amino]-s-triazine.

3. The dyestuff which in its free acid form has the formula, 2-chloro-4-[3′-sulpho-phenylamino]-6-[naphthalene-1″:1‴-azobenzene-2‴:4‴:6″-trisulpho-4″-amino]-s-triazine.

4. The dyestuff which in its free acid form has the formula, 2-chloro-4-[5″:7′:7″-trisulpho-1′:2″-azo-naphthalene-4′-amino]-6-phenylamino-s-triazine.

5. The dyestuff which in its free acid form has the formula, 2-chloro-[5″:7′:7″-trisulpho-1′:2″-azo-naphthalene-4′-amino]-6-ethylamino-s-triazine.

6. The dyestuff which in its free acid form has the formula, 2-chloro-4-[3″:6″:8″-trisulpho-1′:2″-azo-naphthalene-4′-amino]-6-(N-ethyl)phenylamino-s-triazine.

7. The dyestuff which in its free acid form has the formula, 2-chloro-4-[3′-ethoxy-6″:7′:8″-trisulpho-1′:2″-azonaphthalene-4′-amino]-6-amino-s-triazine.

References Cited in the file of this patent

UNITED STATES PATENTS

| | | |
|---|---|---|
| 1,667,312 | Fritzsche et al. | Apr. 24, 1928 |
| 1,867,451 | Gyr et al. | July 12, 1932 |

FOREIGN PATENTS

| | | |
|---|---|---|
| 110,623 | Switzerland | June 16, 1925 |
| 111,276 | Switzerland | Aug. 1, 1925 |